(12) United States Patent
Chen (10) Patent No.: US 10,482,111 B2
(45) Date of Patent: Nov. 19, 2019

(54) CUSTOM PROPERTY CLUSTER DEFINITION FOR A GRAPHIC USER INTERFACE

(71) Applicant: VMware, Inc., Palo Alto, CA (US)

(72) Inventor: Ping Chen, Shanghai (CN)

(73) Assignee: VMWARE, INC., Palo Alto, CA (US)

(*) Notice: Subject to any disclaimer, the term of this patent is extended or adjusted under 35 U.S.C. 154(b) by 199 days.

(21) Appl. No.: 15/375,171

(22) Filed: Dec. 12, 2016

(65) Prior Publication Data

US 2018/0164965 A1    Jun. 14, 2018

(51) Int. Cl.
*G06F 16/28* (2019.01)
*G06F 9/451* (2018.01)

(52) U.S. Cl.
CPC ............ *G06F 16/285* (2019.01); *G06F 9/451* (2018.02)

(58) Field of Classification Search
CPC ....... G06F 3/0484; G06F 3/0482; G06F 17/30
See application file for complete search history.

(56) References Cited

U.S. PATENT DOCUMENTS

| | | | | |
|---|---|---|---|---|
| 2008/0115195 | A1* | 5/2008 | Malek | G06Q 10/06 726/4 |
| 2009/0119618 | A1* | 5/2009 | Norman | G06Q 10/06 715/812 |
| 2011/0093098 | A1* | 4/2011 | Kostadinov | G05B 19/042 700/87 |
| 2014/0258138 | A1* | 9/2014 | Tennant | G06Q 50/08 705/301 |
| 2014/0283031 | A1* | 9/2014 | Eksten | G06F 21/51 726/22 |
| 2014/0380308 | A1* | 12/2014 | Hassine | G06F 9/45558 718/1 |
| 2015/0381711 | A1* | 12/2015 | Singh | H04L 41/0813 709/221 |
| 2016/0188877 | A1* | 6/2016 | Simha | G06F 21/552 726/22 |
| 2017/0017411 | A1* | 1/2017 | Choi | G06F 12/0246 |
| 2017/0302531 | A1* | 10/2017 | Maes | H04L 63/1416 |
| 2018/0164965 | A1* | 6/2018 | Chen | G06F 16/285 |

* cited by examiner

*Primary Examiner* — David E Choi (74) *Attorney, Agent, or Firm* — Su IP Consulting (57) ABSTRACT

An example method for utilizing custom properties in a user interface may include receiving, by an application configuration window, a custom property cluster definition. The custom property cluster definition may include a workflow configuration. The method may also include generating, by the application configuration window, a plurality of custom properties for a graphic user interface (GUI) based on the custom property cluster definition. The method may further include retrieving, by the application configuration window, a plurality of property values corresponding to the plurality of custom properties using the workflow configuration, and displaying, by the application configuration window, the plurality of custom properties and the corresponding plurality of property values on the GUI.

20 Claims, 5 Drawing Sheets

FIGURE 1

Custom Property Cluster Definition Window 210

Name: VM.DiskN.DiskStoragePolicy
Display As: Dropdown
Type: ● Enumeration  ○ Parameterization
Values: ○ Static List  ● External Values Label:
| VM.Home.DiskStoragePolicy | VM Home Storage Policy |
| VM.Disks.DiskStoragePolicy | VM Disk Storage Policy |

Visibility: Global
Data Type: String

Workflow Action: Com.vmware.library/getStoragePolicies

Input Parameters:
| Name | Bind | Value |
|---|---|---|
| endpointName | No | vCenter |
| customProperty | Yes | CUSTOM_PROPERTY |
| tenantName | Yes | TENANT_NAME |

Window with Custom Properties 230

GUI Elements 231
Display Label 233
Dropdown List 235

Instances: 2
CPUs: 4
Memory (MB): 4096
Storage (GB): 200
Description: vSphere_Machine_1

Disk 0 Storage Policy
VM Home Storage Policy >
- External Storage
- Virtual SAN Storage Policy
- Datastore Default Disk 1 Storage Policy
VM Home Storage Policy >
- External Storage
- Virtual SAN Storage Policy
- Datastore Default

```
Custom Property Cluster Definition with Enumeration Cluster
Type

Name:          VirtualMachine.DiskN.DiskStoragePolicy
Cluster Type: Enumeration
    Custom Property Choices:
        [VM.Home.StoragePolicy, VM.Disks.StoragePolicy]

Label:
    Label mapping:
        VM.Home.DiskStoragePolicy = VM Home Storage Policy
        VM.Disks.StoragePolicy    = VM Disks Storage Policy Visibility: Global
Data Type:  String
Display as: Dropdown
Values:     External Values External Workflow: com.vmware.library/getStoragePolicies
External Workflow Inputs:
    endpointName:    vCenter
    customProperty: (bound to) CUSTOM_PROPERTY
    tenantName:     (bound to) TENANT_NAME
```

Example 1

FIGURE 4

```
Custom Property Cluster Definition with Parameterization Cluster
Type

Name:         VirtualMachine.DiskN.DiskStoragePolicy
Cluster Type: Parameterization
    Cluster Parameters: disk_number (Integer)
    Property Pattern:   VM.Disk{disk_number}.StoragePolicy Label:    Disk {disk_number} Storage Policy
Visibility: Global
Data Type:  String
Display as: Dropdown
Values:     External Values External Workflow: com.vmware.library/getStoragePolicies
External Workflow Inputs:
    endpointName: vCenter
    diskNumber:   (bound to) disk_number
    tenantName:   (bound to) TENANT_NAME
```

Example 2

FIGURE 5

CUSTOM PROPERTY CLUSTER DEFINITION FOR A GRAPHIC USER INTERFACE

BACKGROUND

A cloud management system may be used to perform cloud management operations on a cloud system. A generic application blueprint system in the cloud management system may provide an application developer access to the hardware resources required to run an application, enable the application developer to build, deploy, and manage the lifecycle of the application in the cloud system. The cloud management system may support custom properties to allow the application developer to extend various concept models at runtime on demand. The custom properties may be constructed based on custom property definitions that have one-to-one mapping relationships with the custom properties.

In the real world, multiple custom properties, even though having different names, may share a common configuration, and may have the same display style in a graphic user interface. Because of this one-to-one mapping, the application developer needs to repeatedly define multiple almost identical custom property definitions for these custom properties, resulting in tedious, error-prone, and inflexible configuration processes. Furthermore, the multiple tenants in the cloud management system may utilize the same series of custom properties. The one-to-one mapping may require the creating of duplicated custom property definitions for these different tenants.

SUMMARY

System and methods for utilizing custom properties in a user interface is provided. The method may include receiving, by an application configuration window, a custom property cluster definition. The custom property cluster definition may include a workflow configuration. The method may include generating, by the application configuration window, a plurality of custom properties for a graphic user interface (GUI) based on the custom property cluster definition. The method may further include retrieving, by the application configuration window, a plurality of property values corresponding to the plurality of custom properties using the workflow configuration; and displaying, by the application configuration window, the plurality of custom properties and the corresponding plurality of property values on the GUI.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Figure 1:
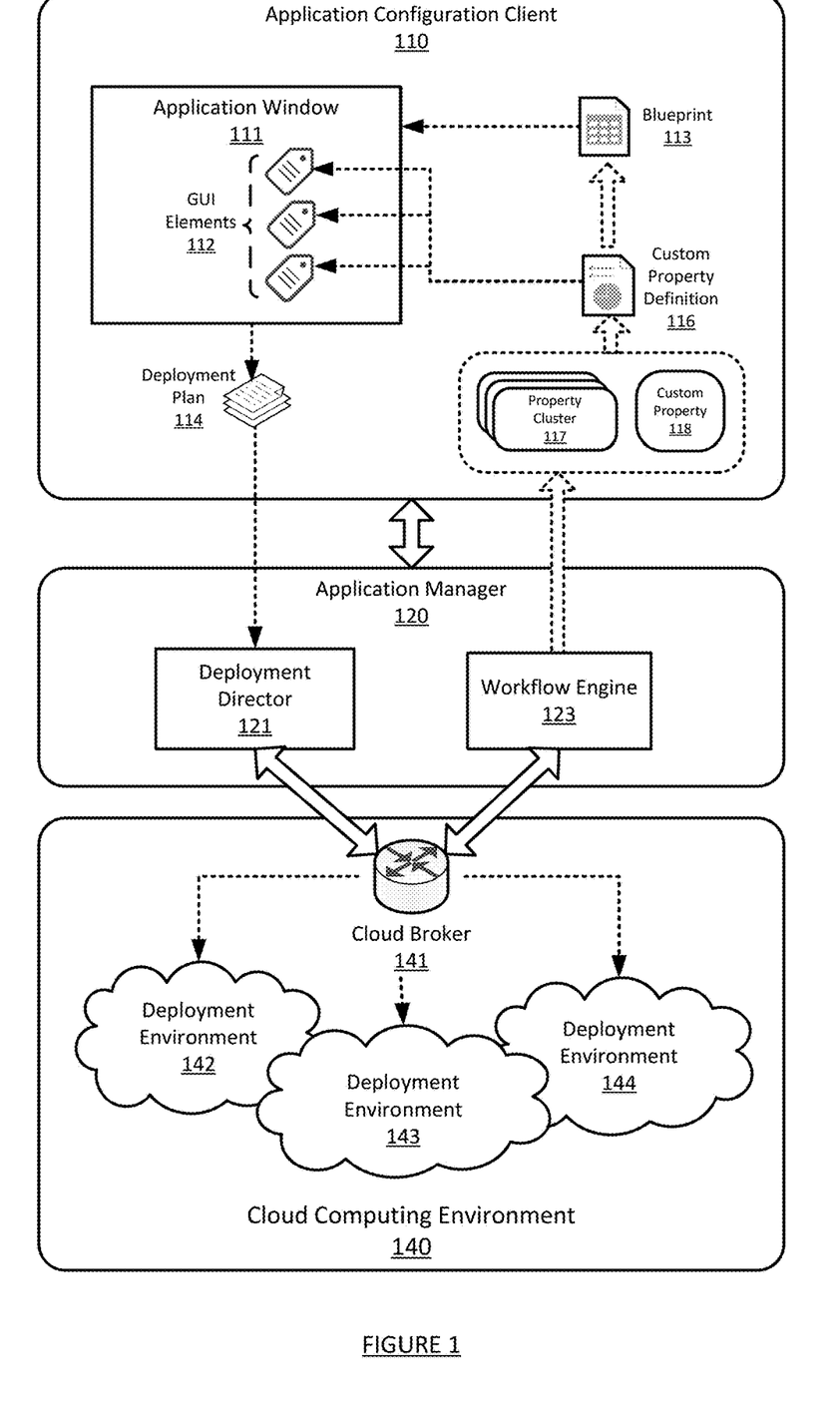
FIG. 1 illustrates a block diagram of a system configured to utilize custom properties for managing a cloud environment, according to one or more embodiments of the present disclosure.

FIG. 1 illustrates a block diagram of a system configured to utilize custom properties for managing a cloud environment, according to one or more embodiments of the present disclosure. In FIG. 1, the system may include an application configuration client 110, an application manager 120, and a cloud computing environment 140 (or "cloud 140"). The application manager 120 may be configured to manage the cloud computing environment 140, as well as the one or more deployment environments 142, 143, and 144 contained therein. The application manager 120 may be accessed by one or more application configuration clients 110, which may be configured to utilize custom properties in managing applications, deployments, and the cloud computing environment 140.

In some embodiments, a "cloud computing environment", or a "cloud", may be a network-based, computing architecture that provides shared pools of cloud resources on demand. A "virtual machine cloud computing environment", or "VM cloud", may be a cloud computing environment implemented using some virtualized computing resources. The cloud 140 may contain, among other components, one or more virtual machines (VMs) and physical machines (all of which are not shown in FIG. 1). The application manager 120 may be responsible for managing the cloud 140, and implementing various cloud functionalities such as resource pooling, resource allocating, high-availability, and automation etc. In some embodiments, the cloud 140 may be constructed using products such as VMWARE® vCloud. The application manager 120 may be implemented using a VMWARE vRealize Suite.

In some embodiments, the application manager 120 may construct a cloud 140 by creating one or more VMs, and implement in the cloud 140 cloud-based functionalities such as VM high-availability, VM load-balancing, VM resource distributions, etc. The VMs may be created based on one or more physical machines having various "physical hardware components", such as, without limitation, one or more physical Central Processing Units (CPUs), physical memory, physical storage (e.g., hard drive), physical Network Interface Card (NIC), and/or additional electronic circuit components. The physical machines may include a "hypervisor" to construct one or more "virtual hardware components" for VMs, based on their physical hardware components. The virtual hardware components, which may include, without limitation, one or more virtual CPUs, virtual memory, virtual storage, virtual NIC, and/or additional virtual components, may be configured to emulate the behaviors and the computing capabilities of the physical hardware components. Thus, the hypervisor may allow the VMs to function as if they were physical machines. Further, the application manager 120 may pool all the resources in the VMs together to form "virtual computing resources" in the cloud 140.

In some embodiments, the cloud 140 may be used to implement one or more deployment environments 142, 143, and 144 for deploying an application. An "application" may refer to any software application and package that need to be designed, developed, tested, installed, configured, and/or executed in the cloud 140. A "deployment environment" may refer to a relatively independent/isolated environment having a set of physical machines, VMs, and configurations, and allowing the application to be developed, tested, and/or executed without being interfered by other environments. As depicted in FIG. 1, the application manager 120 may configure in the cloud 140 a development deployment environment 142, a testing and staging deployment environment 143, and a production deployment environment 144 for a specific application.

In some embodiments, the application manager 120 may utilize a cloud broker 141 to access and manage the cloud 140 and the deployment environments 142, 143, and 144 contained therein. A "cloud broker" may be an application or module tailored to a specific cloud, and configured to perform various tasks in view of the specific cloud's customized implementation and configurations. For example, the cloud broker 141 may be configured to manage application deployment in the cloud 140. In other words, the cloud broker 141 may provide a communication interface through which application manager 120 may interact with the cloud 140. The application manager 120 may interact with the cloud broker 141 via Representational State Transfer (REST) Application Programming Interface (API) or any other client-server communication protocols. For example, the application manager 120 may utilize a VMWARE vCloud Director REST API to communicate with the cloud broker 141.

In some embodiments, the cloud broker 141 may be implemented as a component or service of the cloud 140. In other words, the cloud broker 141 may be operating within the cloud 140's environment. Alternatively, the cloud broker 141 may be implemented as an application or service external to the cloud 140. In this case, the cloud broker 141 may be located at a third-party system, acting as a cloud service customer of the cloud 140, and may interact with the cloud 140 using network communications. In addition, the cloud broker 141 may also be installed as an internal component of the application manager 120.

In some embodiments, the application configuration client 110 may be an interfacing, managing, and communicating application installed on a client computer (e.g., a personal computer or workstation). Specifically, the application configuration client 110 may display one or more application windows 111 to interact with users. The application configuration client 110 may contain software modules to perform functionalities related to custom properties, custom property definitions 116, blueprint 113, and/or deployment plan 114. The application configuration client 110 may communicate with the application manager 120, as well as access and manage the cloud 140 via the application manager 120. The application configuration client 110 may interact with the application manager 120 via Transmission Control Protocol/Internet Protocol (TCP/IP), Hypertext Transfer Protocol (HTTP), or any other network communication means. Alternatively, the application configuration client 110 may be implemented as a software/hardware module executing directly on the application manager 120. In some embodiments, the application configuration client 110 may be implemented using a VMWARE vSphere client.

In some embodiments, the application developer may utilize the application configuration client 110 to display and configure a blueprint 113 for an application, generate a deployment plan 114 based on the blueprint 113, and transmit the generated deployment plan 114 to the application manager 120 for deployment. Specifically, the application manager 120 may include multiple hardware/software modules such as, without limitations, a deployment director 121 and a workflow engine 123. The application configuration client 110 may transmit one or more deployment-related client requests to the deployment director 121 for processing. The application configuration client 110 may also transmit one or more workflow-related client requests to the workflow engine 123 for retrieving information from the cloud 140.

In some embodiments, the application manager 120 may receive one or more client requests, requesting the performing of certain deployment operations on a specific application in the cloud 140. The application manager 120 may implement a blueprint deployment approach to fulfill the client requests. A "blueprint" 113 for the application may include a logical topology of virtual/physical computing resources and application components associated with the deployment of the application. In addition, a blueprint 113 may be an abstract representation of the deployment environment for the application, including virtual/physical machines, application components corresponding to the application, operating systems, services, dependencies, and configurations. A blueprint 113 may be used in the repeated deployments of the application in multiple and possibly diverse deployment environments.

In some embodiments, the blueprint 113 may include a set of application components associated with the application to be deployed. "Application components" may include application-specific binaries, scripts, or processes packaged in file-formats, all of which may be executed to perform the functionalities of the application. Examples of the types of application components include Java Archive (JAR) files, Java Enterprise Archive (EAR) files, Java web application archive (WAR) files, Ruby Gems packages, SQL scripts, and other suitable modules of scripting logic. Further, the blueprint 113 may include hardware infrastructure that can support the execution of the application. Examples of the hardware infrastructure include VMs, physical machines, application servers, database servers, monitoring services, web servers, and any hardware resources that can be provisioned from the cloud 140. The hardware infrastructure in the blueprint 113 may be in the form of one or more nodes, each of which may represent a unit of virtual/physical computing resource in the cloud 140. The application components in the blueprints 113 may be assigned to these nodes, indicating that these application components shall be installed and executed on these nodes during the deployment process.

In some embodiments, the application developer may initiate a deployment process to deploy the application to a specific deployment environment (e.g., the deployment environment 142, 143, or 144). The application configuration client 110 may display a blueprint 113. The application developer may utilize the application configuration client 110 to construct and/or configure a deployment plan 114 based on a blueprint 113. While the blueprint 113 may provide a component-oriented view of the application topology, the deployment plan 114 may provide a step-oriented view of the application topology defined in the blueprint 113 that depicts time dependencies between tasks to deploy the application components in a particular order.

In some embodiments, the deployment plan 114 generated by the application window 111 may include a set of deployment settings (e.g., virtual computing resources' cluster size, CPU, memory, networks) derived from the blueprint 113, as well as an execution plan of tasks having a specified order in which virtual computing resources are provisioned, and application components are installed, configured, and started. A "task" may be a specific operation (such as creation, installation, configuration) that can be implemented based on an executable program or script. For example, a task associated with an application component may be implemented using a computing script comprised of one or more lines of scripting logic that, when executed by a virtual machine on which the application component is hosted, perform operations for an application lifecycle stage (e.g., install, configure, start, stop, upgrade, migrate, etc.). A task may also include requesting installation via a package manager, setting environmental variables, launching runtimes, checking configurations, and other commands.

In some embodiments, in response to client requests from the application configuration client 110, the application manager 120 may utilize the deployment director 121 to execute the deployment plan 114. Specifically, the deployment director 121 may be configured to select a deployment environment (e.g., deployment environment 142) from a listing of available deployment environments in the cloud 140. Afterward, the deployment director 121 may execute the deployment plan 114 and deploy the application to the selected deployment environment in the cloud 140 by communicating with the cloud broker 141 of the cloud 140.

In some embodiments, as specified by the deployment plan 114, the deployment director 121 may provision and configure a set of VMs in the deployment environment 142. Afterward, the deployment director 121 may provide a series of tasks specific to each of the VMs (a "local deployment plan") in the deployment environment 142. For example, the tasks may be scripts that are executed by VMs to install, configure, and/or start one or more application components. The deployment director 121 may coordinates with VMs to execute the tasks in an order that observes installation dependencies between VMs according to the deployment plan 114. After the deployment director 121 completes all the tasks in the deployment plan 114, the application may be been deemed deployed to the production deployment environment 142 in the cloud 140.

In some embodiments, the application configuration client 110 may allow an application developer to define one or more custom properties for displaying as GUI elements on an application window 111. A "GUI element" may refer to any graphic element that can be displayed on the application window 111. Examples of GUI elements may include text-input field, drop-down list, button, menu, etc. Some GUI elements may provide a user interaction interface, through which a user may provide user inputs via keyboard or mouse. For example, a user may select one of the multiple choices provided by a drop-down list, and the selected choice may be deemed a user input. A "custom property" may refer to a property that is not originally associated with a set of information (e.g., a blueprint 113), but can be dynamically and subsequently added to the set of information as a customization. After being created, the custom property may be displayed on the application window 111 in the form of a custom GUI element which is not originally being displayed.

For example, a blueprint 113 may not include a property associated with a storage policy in the cloud 140. As a result, the application window 111 for displaying the blueprint 113 may not show a GUI element that allows a user to input/select a storage policy for generating the deployment plan 114. To allow such functionality, an application developer may create/add in the blueprint 113 a custom property 118 (e.g., "StoragePolicy"), or a custom property definition 116 for the configuration of a single custom property 118. Based on this custom property 118 or custom property definition 116, the application configuration client 110 may display a drop-down GUI element 112 on the application window 111, and provide a user multiple storage policy choices in this drop-down GUI element 112. The user may use a mouse to activate and select from this drop-down GUI element 112 a specific choice as a storage policy user-input.

In some embodiments, during the configuration of a deployment plan 114 based on the blueprint 113, the application developer may face a series of custom properties with different labels but similar GUI styles and functionalities. For example, the deployment plan 114 may require a specific storage policy for each hard drive in the cloud 140. If the deployment plan 114 includes hundreds of hard drives, then the application developer may need to construct hundreds of custom properties based on the blueprint 113. Rather than creating hundreds of custom property definitions 116 each of which is one-to-one mapped to (and used for creating) a corresponding custom property, the blueprint 113 may utilize a custom property cluster definition 116 for the configuration of these multiple similar custom properties.

In some embodiments, a custom property definition 116 may be for defining a single custom property 118, or for defining a custom property cluster 117. For clarification purposes, when defining a custom property 118, the custom property definition 116 may be referred to as a "single custom property definition". When defining a custom property cluster 117, the custom property definition 116 may be referred to as a "custom property cluster definition." Thus, the single custom property definition may have a one-to-one mapping with a custom property, and the custom property cluster definition may have a one-to-many mapping with multiple custom properties.

In some embodiments, the application developer may add a custom property into the blueprint 113 by referencing a property identifier (e.g., a unique number or string) that can be used to identify a specific custom property or a specific custom property definition 116 associated with the custom property. The application configuration client 110 may maintain a list of custom properties, and/or custom property definitions 116 for all the custom properties used by the application configuration client 110, and may retrieve a specific custom property or custom property definition 116 based on a property identifier. Alternatively, the application manager 120 and/or the cloud 140 may be configured to maintain the list of custom properties and/or the list of custom property definitions 116, and the application configuration client 110 may communicate with the application manager 120 to retrieve a specific custom property or custom property definition 116 based on the property identifier.

In some embodiments, to display the blueprint 113, the application configuration client 110 may extract one or more property identifiers from the blueprint 113, and retrieve the custom properties and/or the custom property definitions 116 based on these property identifiers. Afterward, the application configuration client 110 may process each of the custom properties and/or custom property definitions 116 to determine how to generate the GUI elements.

In some embodiments, if the application configuration client 110 determines that a specific property identifier is associated with a custom property, the application configuration client 110 may retrieve a custom property definition 116 corresponding to this custom property. In addition, if the retrieved custom property definition 116 is a single custom property definition, the application configuration client 110 may generate a single GUI element 112 for displaying on the application window 111. Alternatively, if the application configuration client 110 determines that a specific property identifier is associated with a single custom property definition, then the application configuration client 110 may generate a one-to-one mapping custom property, and generate a single GUI element 112 for displaying on the application window 111.

In some embodiments, if the application configuration client 110 determines that a specific property identifier is associated with a custom property, and the custom property corresponds to a custom property cluster definition, then the application configuration client 110 may retrieve corresponding configurations associated with the custom property, and generate a single GUI element 112 for displaying on the application window 111. Alternatively, if the application configuration client 110 determines that a specific property identifier is associated with a custom property cluster definition, then the application configuration client 110 may generate multiple custom properties, as well as a corresponding number of GUI elements 112 for displaying on the application window 111.

In some embodiments, a custom property cluster definition 116 may have an "enumeration cluster type" and a "parameterization cluster type." When the custom property cluster definition 116 has an enumeration cluster type, the custom property cluster definition 116 may contain a fixed list of custom property choices. In this case, the application configuration client 110 may generate one or more custom properties based on the custom property choices enumerated in the custom property cluster definition 116, and construct a same number of GUI elements 112 as these one or more custom properties.

In some embodiments, if the custom property cluster definition 116 has a parameterization cluster type, the custom property cluster definition 116 may contain a "cluster parameter" and a "property pattern", which may be used to generate a dynamic number of custom properties. Specifically, the application configuration client 110 may retrieve from the application manager 120 a set of parameter values (as a list such as [1, 2, 3], or a value range such as [>=1 & <=3]) based on the cluster parameter. Afterward, the application configuration client 110 may combine each of the parameter values with the property pattern (or apply the property pattern to each of the parameter values), and generate a set of custom property choices. Afterward, the application configuration client 110 may generate custom properties based on the custom property choices, and construct a same number of GUI elements 112 as these one or more custom properties.

In some embodiments, the custom property cluster definition 116 may have, among other configurations, a workflow configuration for generating the details corresponding to one or more custom properties. The workflow configuration may include workflow logics as well as input parameters. The application configuration client 110 may transmit the workflow configuration of the custom property definition 116 to the workflow engine 123 of the application manager 120. Upon receiving the workflow configuration, the workflow engine 123 may extract the workflow logics as well as the input parameters from therein, and execute the workflow logics using the input parameters for input. The outputs from the workflow engine 123 may be deemed a set of property values, which may be used to populate the details of the custom properties.

In some embodiments, the workflow engine 123 may interact with the cloud broker 141 to extract information from the cloud 140. For example, the workflow engine 123 may invoke relevant cloud services provided by the cloud 140 via the cloud broker 141, in order to retrieve a list of storage policies that are configured in the deployment environment 143. The workflow engine 123 may return the retrieved list of storage policies to the application configuration client 110 as a set of property values. If the application configuration client 110 is to generate a custom property based on a single custom property definition 116, the application configuration client 110 may create a GUI element 112 (e.g., a drop-down list) for the application window 111, and use the list of storage policies received from the application manager 120 as property choices for the GUI element 112. Likewise, if the application configuration client 110 is to generate a set of custom properties based on a custom property cluster definition 116, the application configuration client 110 may create one custom property at a time, retrieve a corresponding set of property values for this custom property based on the workflow configuration, and construct a GUI element 112 for the custom property using the corresponding set of property values. The application configuration client 110 may repeat the above process till finished creating all the custom properties.

In some embodiments, the custom property cluster definition 116 may include, among other configurations, a label configuration for generating a display name (or display label) for the GUI element 112 in the application window 111. Specifically, if the application configuration client 110 is to generate a set of display labels based on a custom property cluster definition 116, then for each custom property generated, the application configuration client 110 may create a display label by applying the label configuration to one of the parameter values (as discussed above) that is associated with the custom property.

In some embodiments, after the custom properties and the GUI elements 112 are constructed, the application configuration client 110 may display the GUI elements 112 in an application window 111. A user may interact with the GUI elements 112 in the application window 111, and input/select a specific value for each of the GUI elements 112. The application configuration client 110 may store the user inputs into the custom properties, and use the user inputs to generate the deployment plan 114. For example, a custom property "StoragePolicy" may be shown as a GUI element 112. A user may select a "High IO shares allocation" value as a user input for the GUI element 112 and the custom property. The application configuration client 110 may store this user input in this custom property "StoragePolicy", and may use this user input in the deployment plan 114.

Thus, by utilizing the custom property cluster definition, an application developer may configure one custom property cluster definition for a series of custom properties. Further, a custom property cluster definition may be used as a global concept in the cloud 140, and can be shared among multiple tenants of the cloud 140. Also, different custom properties belonging to different context may be generated based on a single workflow configuration.

Figure 2:
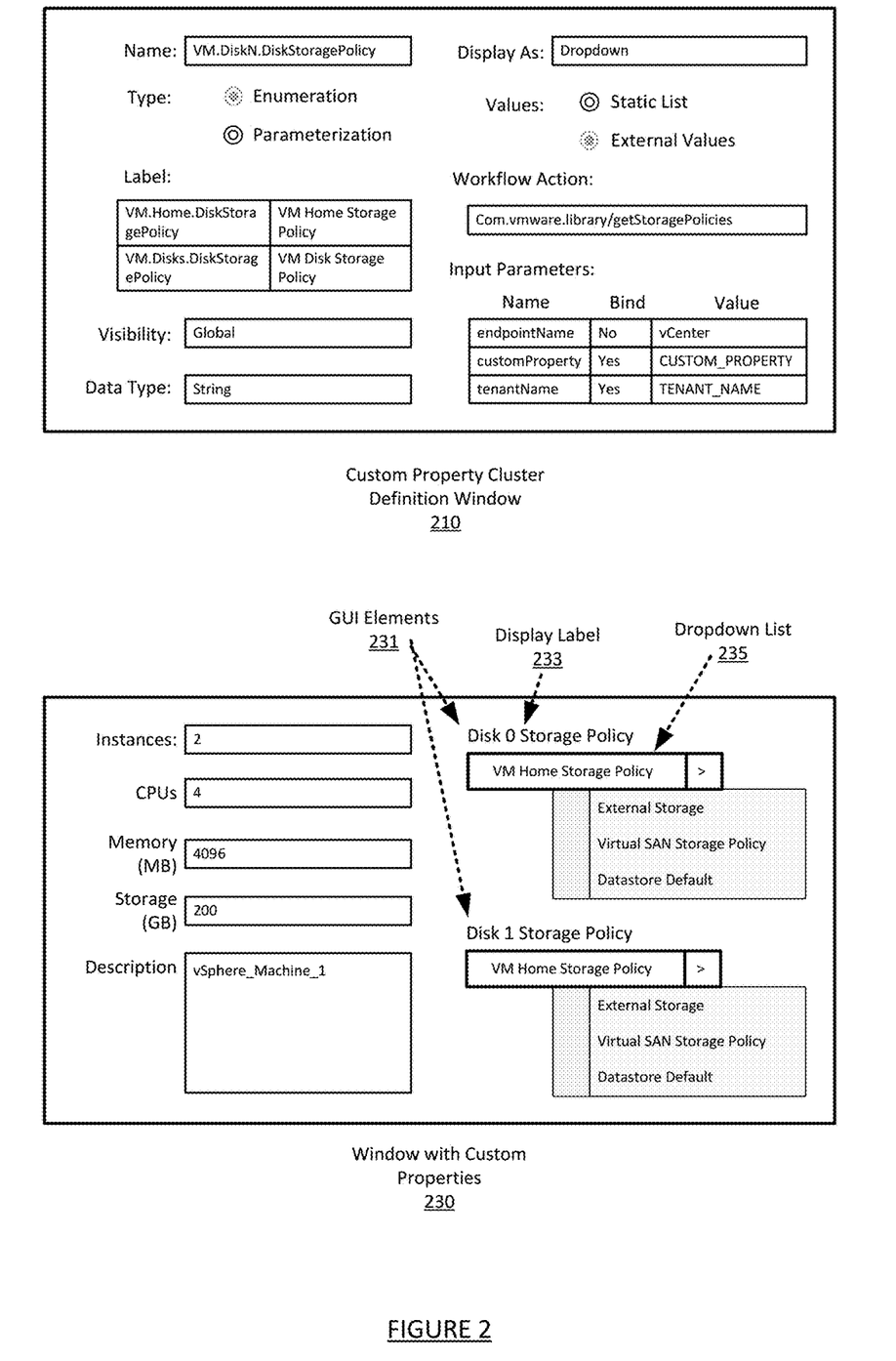
FIG. 2 illustrates multiple GUI windows configured to manage and display custom properties, according to one or more embodiments of the present disclosure.

FIG. 2 illustrates multiple GUI windows configured to manage and display custom properties, according to one or more embodiments of the present disclosure. In FIG. 2, an application configuration client may utilize a window 210 to configure a custom property cluster definition. The window 230 may be used for displaying the custom properties that are configured based on a custom property cluster definition.

Figure 4:
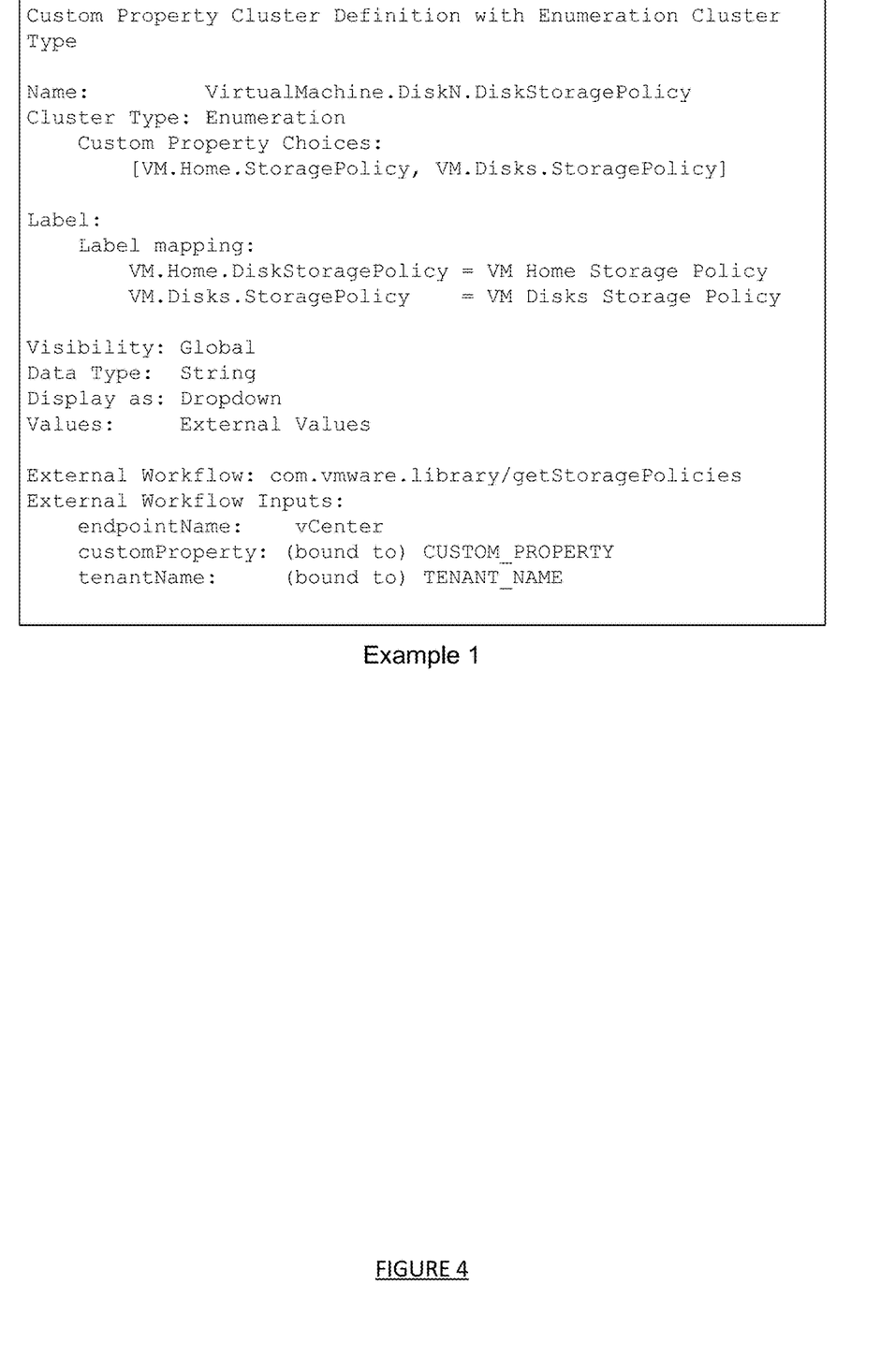
FIG. 4 shows one example of a custom property cluster definition, according according to one or more embodiments of the present disclosure.
Figure 5:
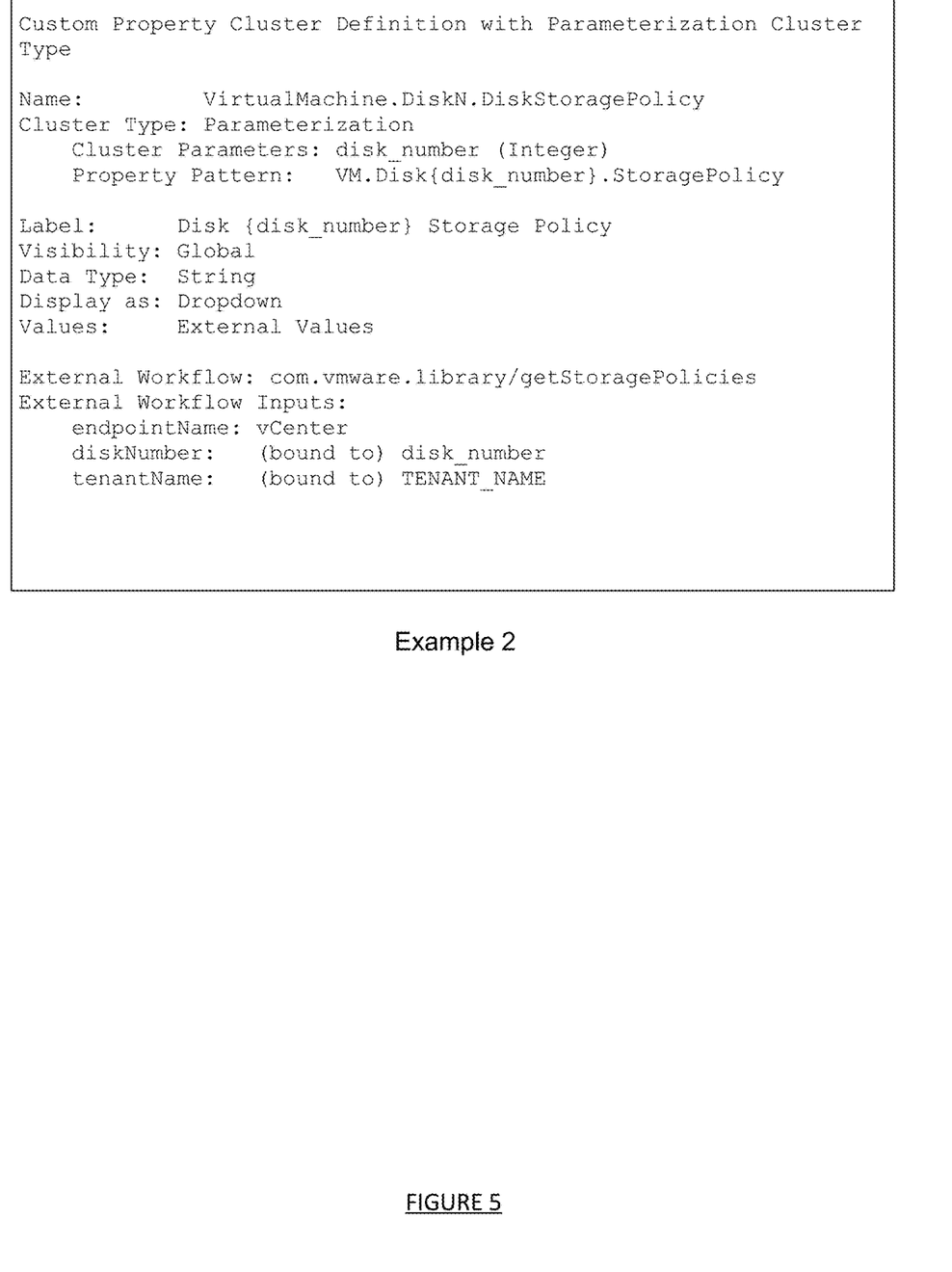
FIG. 5 shows another example of a customer property cluster definition, according to one or more embodiments of the present disclosure.

In some embodiments, a custom property cluster definition created in window 210 may be illustrated in the Example 1 of FIG. 4 or Example 2 of FIG. 5. Besides a definition name, each custom property cluster definition may have a "cluster type", which may be enumeration, parameterization, or any other cluster type. An enumeration cluster type indicates that the custom property cluster definition may include a series of discrete "custom property choices." A parameterization cluster type may be used to create custom properties that are related to one or more "cluster parameters" and one "property pattern." Specifically, a "cluster parameter" may refer to a specific keyword for identifying a relevant piece of information. And a "property pattern" may be a predefined string embedded with one or more cluster parameters.

The custom property cluster definition in Example 1 as illustrated in FIG. 4 may have an "Enumeration" cluster type, and may include two custom property choices: "VM.Home.StoragePolicy" and "VM.Disks.StoragePolicy." Thus, an application configuration client may create one or two custom properties by selecting one or two of these custom property choices. The two created custom properties may be named "VM.Home.StoragePolicy" and "VM.Disks.StoragePolicy", and may have a "String" data type. Further, the two custom properties may have a "global" visibility, indicating they may be visible and used throughout the cloud 104. Further, if the blueprint contains a property identifier for the custom property (e.g., "VM.Home.StoragePolicy"), and the application configuration client determines that this custom property is defined in a custom property cluster definition as shown in Example 1, then the application configuration client may select one of the two custom property choices in Example 1 (e.g., selecting "VM.Home.StoragePolicy"), and utilize the configurations associated with this custom property choice to create a GUI element.

In some embodiments, the application configuration client may construct two drop-down GUI elements for these two custom properties, based on the "Display as" configuration in the custom property cluster definition. The application configuration client may fill the drop-down GUI element for custom property VM.Home.StoragePolicy, with "External Values" obtained via "External Workflow." In other words, the custom property cluster definition may have a workflow configuration which contains workflow logics (e.g., com.vmware.library/getStoragePolicies) and input parameters as shown under "External Workflow Inputs." Thus, the application configuration client may invoke the workflow engine of an application manager by passing the workflow configuration along with an input parameter "custom Property" that is filled with the value "VM.Home.StoragePolicy."

Afterward, the application configuration client may receive a set of property values generated by the workflow engine processing the workflow configuration. The received set of property values may be used as "external values" to fill the drop-down GUI elements associated with the custom property "VM.Home.StoragePolicy." Likewise, the application configuration client may perform the above process one more time to fill the second drop-down GUI element for custom property "VM.Disks.StoragePolicy."

The custom property cluster definition in Example 1 as illustrated in FIG. 4 may have a label configuration for generating display labels for the GUI elements. Based on the "Label mapping" in the custom property cluster definition, the application configuration client may generate two display labels for the two GUI elements that are associated with the two custom properties. Specifically, the application configuration client may generate a display label "VM Home Storage Policy" for the first GUI element that is associated with the first custom property "VM.Home.StoragePolicy", and generate a display label "VM Disks Storage Policy" for the second GUI element that is associated with the second custom property "VM.Disks.StoragePolicy."

The custom property cluster definition in Example 2 as illustrated in FIG. 5 may have a "Parameterization" cluster type, and may include a dynamic number of custom property choices that is generated based on one or more "Cluster Parameters" and "Property Pattern." In this case, the cluster parameter may be disk_number, which may be the corresponding numbers for all the disks in a deployment environment or in a cloud 140. For example, during the generating of the deployment plan based on a blueprint, the application configuration client may interact with the application manager to retrieve the numbers for all the physical disks in a deployment environment in the cloud. The application configuration client may treat the retrieved disk numbers as "parameter values", and use these parameter values to dynamically generate a set of custom property choices based on the property pattern. Afterward, the application configuration client may create a number of custom properties based on this set of custom property choices.

For example, the application configuration client may receive from the application manager a set of disk numbers (e.g., "0", and "1"). This set of disk numbers may be applied to the property pattern "VM.Disk{disk_number}.StoragePolicy", resulting custom property choices "VM.Disk0.StoragePolicy" and VM.Disk1.StoragePolicy." Based on these two custom property choices, the application configuration client may create two corresponding custom properties and two corresponding GUI elements.

As shown in FIG. 2's window 230, the application configuration client may construct two drop-down GUI elements 231 for these two custom properties, based on the "Display as" configuration in the custom property cluster definition. The application configuration client may fill the drop-down list 235 of the GUI element 231 for custom property VM.Disk0.StoragePolicy, with "External Values" obtained via "External Workflow." In other words, the custom property cluster definition may have a workflow configuration which contains workflow logics (com.vmware.library/getStoragePolicies) and input parameters as shown under "External Workflow Inputs."

In some embodiments, the application configuration client may invoke the workflow engine of an application manager by passing the workflow configuration along with an input parameter "diskNumber" that is filled with disk number "0". Afterward, the application configuration client may receive a set of property values generated by the workflow engine processing the workflow configuration. The received set of property values may be used as "external values" to fill the drop-down list 235 associated with the custom property "VM.Disk0.StoragePolicy." Afterward, the application configuration client may perform the above process one more times to fill the drop-down GUI elements for custom properties "VM.Disk1.StoragePolicy."

The custom property cluster definition in Example 2 as illustrated in FIG. 5 may have a label configuration for generating display labels for the GUI elements. Specifically, the label configuration contains a pattern ("Disk {disk_number} Storage Policy) that can be filled with a cluster parameter (e.g., disk_number). Based on this label configuration, the application configuration client may generate two display labels 233 for the two GUI elements that are associated with the two custom properties. Specifically, the application configuration client may generate a first display label "Disk 0 Storage Policy" for the first GUI element that is associated with the first custom property "VM.Disk0.StoragePolicy", and generate a second display label "Disk 1 Storage Policy" for the second GUI element that is associated with the second custom property "VM.Disk1.StoragePolicy."

Figure 3:
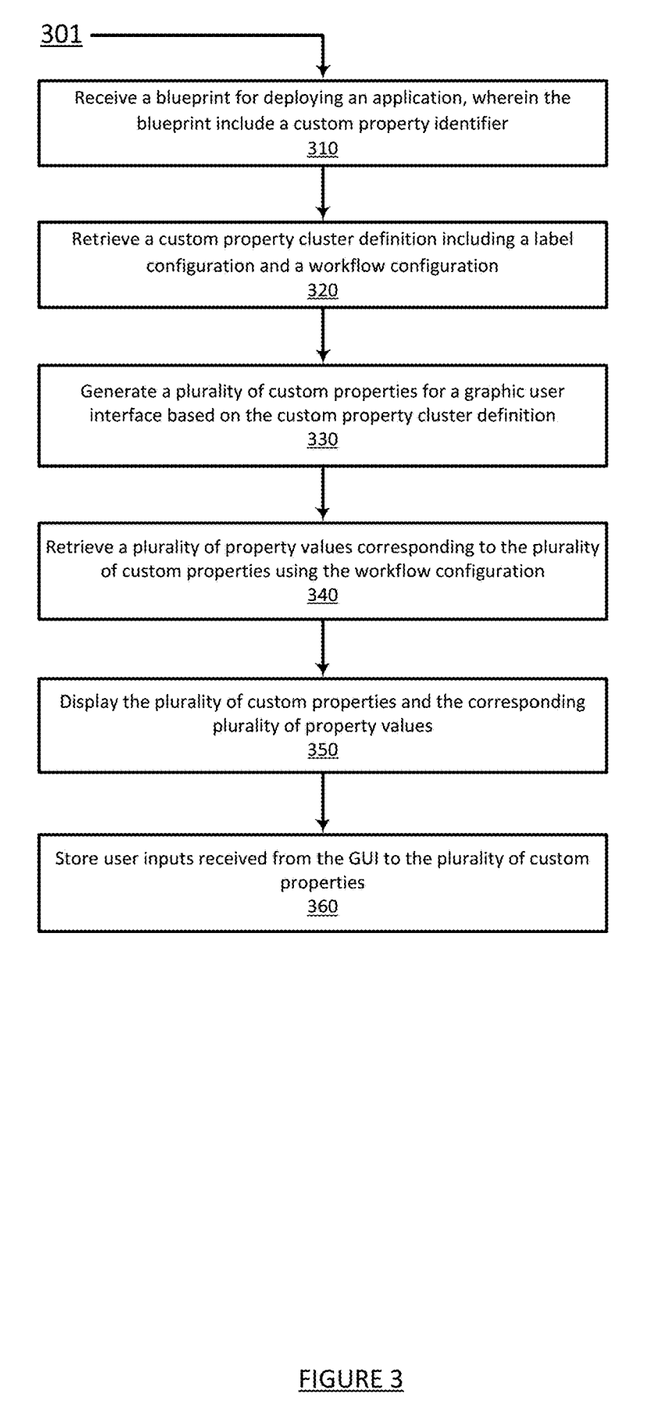
FIG. 3 shows a flow diagram illustrating a process to utilize custom properties in a graphic user interface, according to one or more embodiments of the present disclosure.

FIG. 3 shows a flow diagram illustrating a process to utilize custom properties in a graphic user interface, according to one or more embodiments of the present disclosure. The processes 301 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 310, an application configuration window for managing a cloud environment via an application manager may receive a blueprint for deploying an application in the cloud environment. The blueprint may include at least one custom property identifier.

At block 320, the application configuration window may retrieve a custom property cluster definition based on the custom property identifier. The custom property cluster definition may include a label configuration and a workflow configuration.

At block 330, the application configuration window may generate a plurality of custom properties for a graphic user interface (GUI) based on the custom property cluster definition. In some embodiments, the custom property cluster definition may have an enumeration cluster type and include a plurality of custom property choices. In this case, the application configuration window may generate the plurality of custom properties based on one or more custom property choices selected from the plurality of custom property choices.

In some embodiments, the custom property cluster definition may have a parameterization cluster type and include a cluster parameter and a property pattern. In this case, the application configuration window may generate the plurality of custom properties by retrieving a plurality of parameter values based on the cluster parameter. Afterward, the application configuration window may generate a plurality of custom property choices by applying the plurality of parameter values to the property pattern, and generate the plurality of custom properties based on the plurality of custom property choices.

At block 340, the application configuration window may retrieve a plurality of property values corresponding to the plurality of custom properties using the workflow configuration in the custom property cluster definition. Specifically, the application configuration window may transmit the workflow configuration to a workflow engine. The workflow engine may be configured to interact with a cloud broker of a cloud environment, and generate the plurality of property values by communicate with the cloud broker to execute workflow logics contained in the workflow configuration.

At block 350, the application configuration window may display the plurality of custom properties and the corresponding plurality of property values on the GUI. Specifically, for each custom property in the plurality of custom properties, the application configuration window may generate a corresponding display label for displaying on the GUI using the label configuration in the custom property cluster definition. In some embodiments, the application configuration window may generate the corresponding display label by applying the label configuration to a parameter value retrieved based on a cluster parameter defined in the custom property cluster definition. In other words, the label configuration may contain a property pattern, and the application configuration window may integrate the parameter value into the property pattern to generate the display label.

In some embodiments, the application configuration window may display the plurality of property values along with the displaying of the plurality of custom properties. Further, the application configuration window may display the display labels along with the displaying of the plurality of custom properties.

At block 360, the application configuration window may receive user inputs associated with the displayed plurality of custom properties, and may store the user inputs received from the GUI to the plurality of custom properties. Further, the application configuration window may generate a deployment plan for the application based on the plurality of custom properties and the user inputs.

Thus, systems and methods for utilizing custom properties in a user interface have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method for utilizing custom properties in a user interface, the method comprising:
   receiving, by an application configuration client for managing a cloud environment, a blueprint for deploying an application in the cloud environment and a custom property cluster definition, wherein the custom property cluster definition includes a workflow configuration for a workflow engine configured to interact with a cloud broker of the cloud environment;
   generating, by the application configuration client, a plurality of deployment settings derived from the blueprint and a plurality of custom properties for a graphic user interface (GUI) based on the custom property cluster definition;
   retrieving, by the application configuration client, a plurality of property values corresponding to the plurality of custom properties using the workflow configuration; and
   displaying, by the application configuration client, the plurality of custom properties and the corresponding plurality of property values on the GUI, wherein the custom property cluster definition corresponds to a plurality of custom properties not included in the blueprint at a first time.

2. The method as recited in the claim 1, wherein the custom property cluster definition includes a label configuration, and the displaying of the plurality of custom properties comprising:
   for each custom property of the plurality of custom properties, generating a corresponding display label for displaying on the GUI using the label configuration.

3. The method as recited in the claim 2, wherein the generating of the corresponding display label using the label configuration comprising:
   generating the corresponding display label by applying the label configuration to a parameter value retrieved based on a cluster parameter defined in the custom property cluster definition.

4. The method as recited in the claim 1, wherein the custom property cluster definition has an enumeration cluster type and includes a plurality of custom property choices, and the generating of the plurality of custom properties comprising:
   generating the plurality of custom properties based on one or more custom property choices selected from the plurality of custom property choices.

5. The method as recited in the claim 1, wherein the custom property cluster definition has a parameterization cluster type and includes a cluster parameter and a property pattern, and the generating of the plurality of custom properties comprising:
   retrieving a plurality of parameter values based on the cluster parameter;

generating a plurality of custom property choices by applying the plurality of parameter values to the property pattern; and generating the plurality of custom properties based on the plurality of custom property choices.

6. The method as recited in the claim 1, wherein the retrieving of the plurality of property values comprising:

transmitting, by the application configuration client, the workflow configuration to the workflow engine, wherein the workflow engine is configured to generate the plurality of property values by executing workflow logics contained in the workflow configuration.

7. The method as recited in the claim 1, further comprising:

storing, by the application configuration client, user inputs received from the GUI to the plurality of custom properties.

8. A non-transitory computer-readable storage medium, containing a set of instructions which, in response to execution by a processor, cause the processor to perform a method for utilizing custom properties in a user interface, the method comprising:

receiving, by an application configuration client for manage a cloud environment, a blueprint for deploying an application in the cloud environment, wherein the blueprint includes a custom property identifier;

retrieving, by the application configuration client, a custom property cluster definition based on the custom property identifier;

generating, by the application configuration client, a plurality of deployment settings derived from the blueprint and a plurality of custom properties based on the custom property cluster definition; and displaying, by the application configuration client, the plurality of custom properties along with the displaying of the blueprint, wherein the custom property cluster definition corresponds to a plurality of custom properties not included in the blueprint at a first time.

9. The non-transitory computer-readable storage medium of the claim 8, wherein the custom property cluster definition has an enumeration cluster type and includes a plurality of custom property choices, and the generating of the plurality of custom properties based on the custom property cluster definition comprising:

generating the plurality of custom properties by selecting one or more custom property choices from the plurality of custom property choices.

10. The non-transitory computer-readable storage medium of the claim 9, wherein the generating of the plurality of custom properties based on the custom property cluster definition further comprising:

for each custom property in the plurality of custom properties, retrieving a corresponding property value using a workflow configuration in the custom property cluster definition, wherein the corresponding property value is configured to be displayed along the custom property during the displaying of the plurality of custom properties.

11. The non-transitory computer-readable storage medium of the claim 9, wherein the generating of the plurality of custom properties based on the custom property cluster definition further comprising:

for each custom property in the plurality of custom properties, generating a corresponding display label using a label configuration in the custom property cluster definition, wherein the corresponding display label is configured to be displayed along with the custom property during the displaying of the plurality of custom properties.

12. The non-transitory computer-readable storage medium of the claim 8, wherein the custom property cluster definition has a parameterization cluster type and includes a cluster parameter and a property pattern, and the generating of the plurality of custom properties comprising:

retrieving a plurality of parameter values based on the cluster parameter;

generating a plurality of custom property choices by applying the plurality of parameter values to the property pattern; and generating the plurality of custom properties based on the plurality of custom property choices.

13. The non-transitory computer-readable storage medium of the claim 12, wherein the displaying of the plurality of custom properties comprising:

for each parameter value in the plurality of parameter values, generating a corresponding display label using a label configuration in the custom property cluster definition and the parameter value; and displaying the display label along with the displaying of the plurality of custom properties.

14. The non-transitory computer-readable storage medium of the claim 8, wherein the method further comprising: receiving, by the application configuration client, user inputs associated with the displayed plurality of custom properties; and generating, by the application configuration client, a deployment plan for the application based on the plurality of custom properties and the user inputs.

15. A system for utilizing custom properties in a cloud environment, the system comprising:

an application manager including a workflow engine configured to interact with the cloud environment; and an application configuration client coupled with the application manager, wherein the application configuration client is configured to:

generate (1) a plurality of deployment settings derived from a blueprint for deploying an application in the cloud environment and (2) a plurality of custom properties based on a custom property cluster definition having a workflow configuration, retrieve, from the application manager, a plurality of property values corresponding to the plurality of custom properties using the workflow configuration, and display the plurality of custom properties and the corresponding plurality of property values, wherein the custom property cluster definition corresponds to a plurality of custom properties not included in the blueprint at a first time.

16. The system of claim 15, wherein the application manager includes a workflow engine, and the workflow engine generates the plurality of property values by executing workflow logics contained in the workflow configuration.

17. The system of claim 16, wherein the cloud environment includes a cloud broker, and the workflow engine generates the plurality of property values by communicating with the cloud broker.

18. The system of claim 15, wherein the application configuration client is further configured to:

display a blueprint for deploying an application in the cloud environment;

receive user inputs associated with the displayed plurality of custom properties; and generate a deployment plan for the application based on the plurality of custom properties and the user inputs.

19. The system of claim 15, wherein the custom property cluster definition has an enumeration cluster type and includes a plurality of custom property choices, and the application configuration client is further configured to generate the plurality of custom properties based on one or more custom property choices selected from the plurality of custom property choices.

20. The system of claim 15, wherein the custom property cluster definition has a parameterization cluster type and includes a cluster parameter and a property pattern, and the application configuration client is further configured to:

retrieve a plurality of parameter values based on the cluster parameter; and generating a plurality of custom properties by applying the plurality of parameter values to the property pattern.

* * * * *